(Model.)

J. F. WOLLENSAK.
TRAP LOCK.

No. 372,834. Patented Nov. 8, 1887.

3 Sheets—Sheet 1.

Witnesses:
Chas. E. Gaylord
George C. Cook

Inventor:
John F. Wollensak
By Banning & Banning,
Attys.

(Model.)
3 Sheets—Sheet 2.
J. F. WOLLENSAK.
TRAP LOCK.
No. 372,834. Patented Nov. 8, 1887.
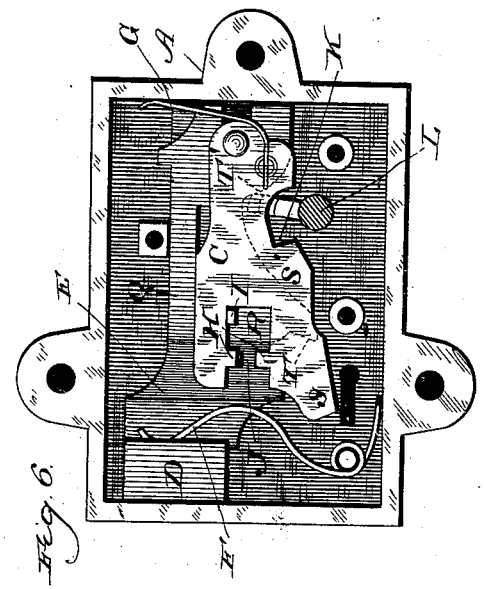
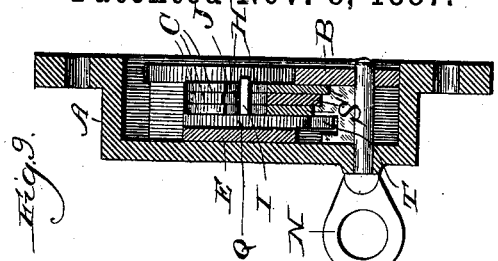
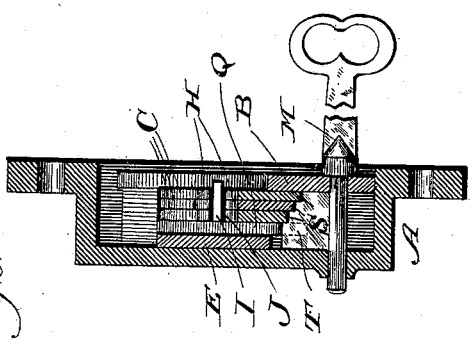
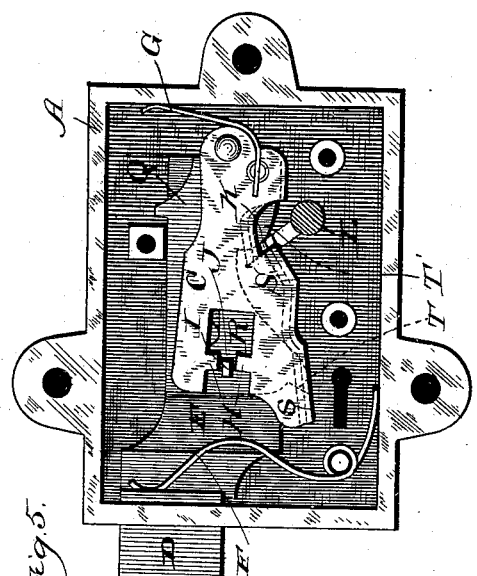
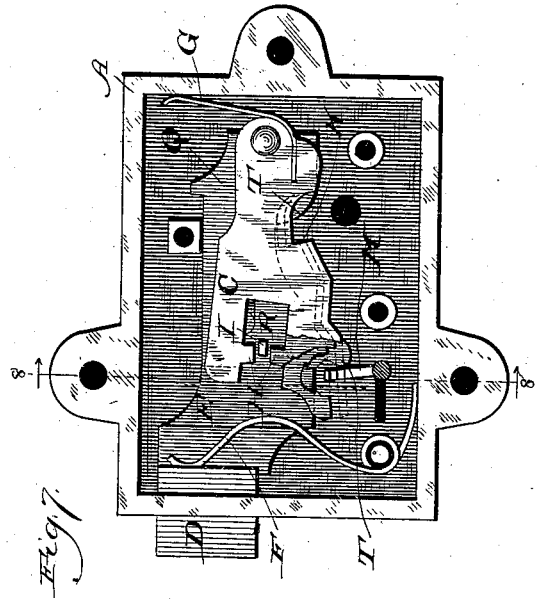
Witnesses:
Chas. E. Gaylord.
George C. Cook.
Inventor:
John F. Wollensak,
By Banning & Banning,
Attys.
N. PETERS, Photo-Lithographer, Washington, D. C.

(Model.)
3 Sheets—Sheet 3.
J. F. WOLLENSAK.
TRAP LOCK.
No. 372,834. Patented Nov. 8, 1887.
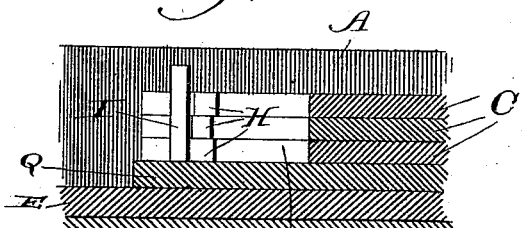
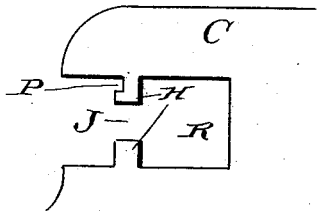
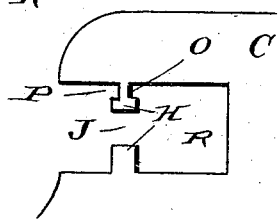
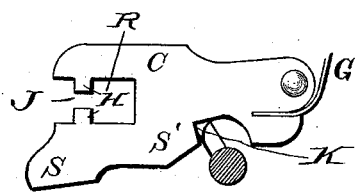
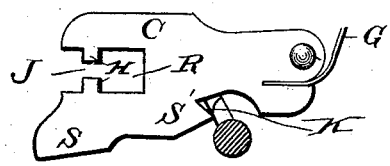
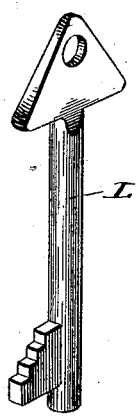
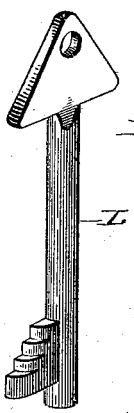
Witnesses:
Chas. E. Gaylord,
George C. Cook.
Inventor:
John F. Wollensak,
By Banning & Banning,
Attys.

UNITED STATES PATENT OFFICE.

JOHN F. WOLLENSAK, OF CHICAGO, ILLINOIS.

TRAP-LOCK.

SPECIFICATION forming part of Letters Patent No. 372,834, dated November 8, 1887.

Application filed March 5, 1887. Serial No. 229,775. (Model.)

*To all whom it may concern:*

Be it known that I, JOHN F. WOLLENSAK, a citizen of the United States, residing at Chicago, Illinois, have invented certain new and useful Improvements in Trap-Locks, of which the following is a specification.

The object of my invention is to make a trapped latch-lock, designed principally for street telephone and fire-alarm boxes, which locks by a spring-bolt upon closing the door, of a simple construction, and that shall be practically unpickable; and my invention consists of the features and details of construction hereinafter described and claimed.

Heretofore locks of this class have been made and used with main keys that, after unlocking the lock from the outside, could not be turned back to the position they occupied when first inserted or withdrawn from the lock until a release-key had been inserted from the inside to throw the tumblers up and release the main key. Main but not release keys would be delivered to citizens in the neighborhood of the fire or telephone box, and each key numbered and registered against the name of the citizen to whom it had been intrusted. Upon the unlocking of the box by a citizen his key would remain in the lock until released by the release-key in the hands of the officials, and so inform the police or fire department as to who had unlocked the box; but experience has shown that the locks in common use are liable to be picked and the key removed, and to enable the officials to unlock the box they must be provided with a main key as well as a release-key to remove the citizen's key or their own upon opening the box. This necessitates their carrying two keys. I propose to obviate these objections by rendering the lock practically unpickable and at the same time dispense with the use of the main key by the official.

Figure 2:
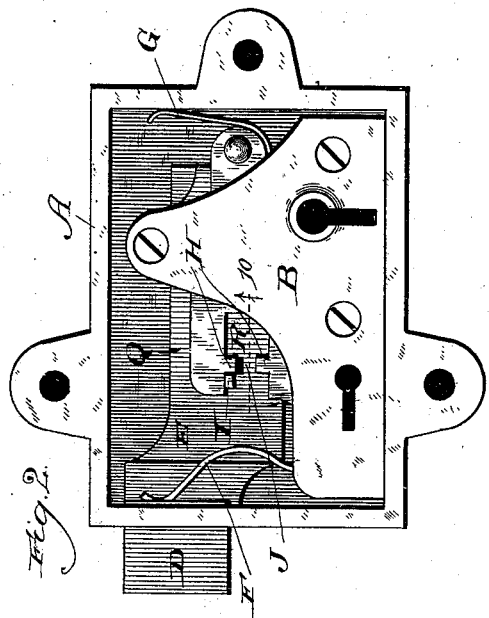
Figure 3:
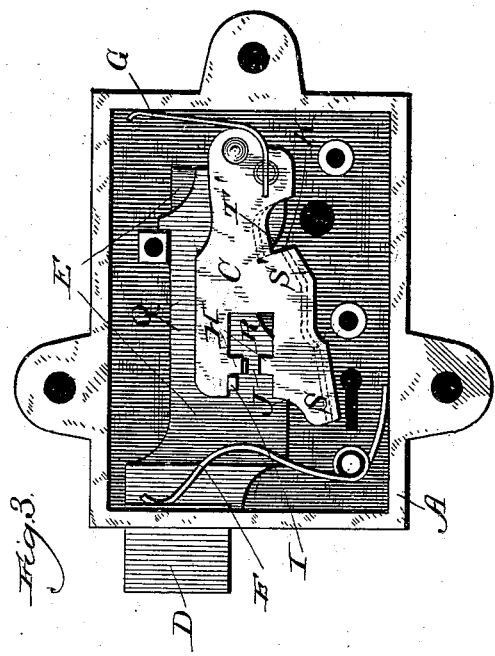
Figure 1:
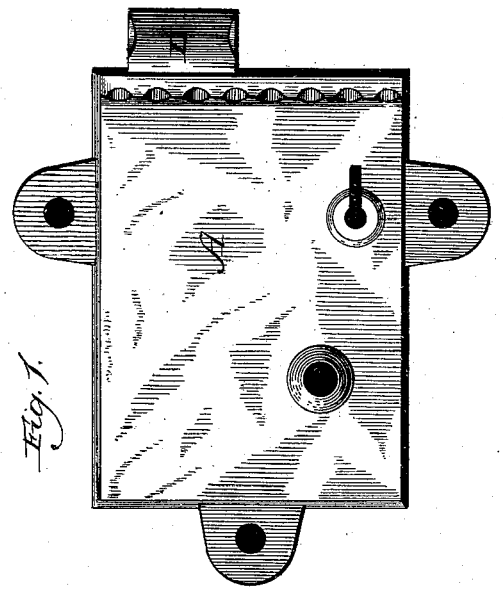
Figure 4:
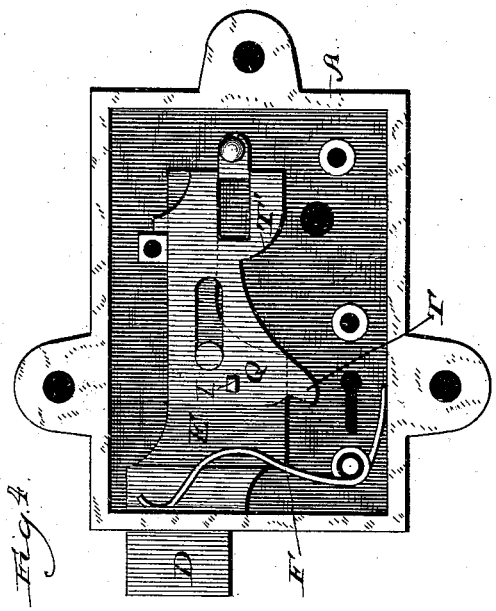

In the drawings, Figure 1 is a back view of the lock. Fig. 2 is a face view of the lock before attaching it to the door. Fig. 3 is a face view of the lock with the face-plate removed. Fig. 4 is a face view of the lock with the face-plate and the tumblers removed, showing the shank or bolt tail and the bolt-slide lying thereon. Fig. 5 is a face view of the lock with the face-plate removed and the main key inserted and moved part way round. Fig. 6 is a face view of the lock with the face-plate removed and the main key turned round to its limit and the bolt drawn back and the tumblers down. Fig. 7 is a face view of the lock with the face-plate removed and with the outside release-key inserted and partially turned, with a portion of the tumblers broken away, showing key in contact with the front talon of the bolt-slide. Fig. 8 is a transverse vertical section taken in the line 8 of Fig. 7, showing the outside release-key in place. Fig. 9 is a transverse vertical section taken in the line 8 of Fig. 7, showing the inside release-key in place. Fig. 10 is an enlarged sectional view on line 10 of Fig. 2. Fig. 11 is an enlarged modified form of one of the tumblers shown in Fig. 3. Fig. 12 is an enlarged view of one of the tumblers shown in Fig. 2. Fig. 13 is a view of a tumbler with rounded key in contact with the notch on the tumbler made at about a right angle. Fig. 14 is a view of the same with the notch made at an acute angle. Fig. 15 is a perspective view of a square-cornered main key, and Fig. 16 is a perspective view of a round-cornered main key.

In the drawings, A is the lock-frame; B, the face-plate; C, the tumblers; D, the bolt; E, the tail or shank of the bolt; F, the spring by which the bolt is thrust out; G, the spring by which the tumblers are held down; H, the racking-studs; I, the racking-stump; J, the gate between the studs on the tumblers; K, the notch that traps the main key; L, the main key; M, the master-key; N, the release-key; O, a notch on the inside of the tumbler racking-stud; P, a notch on the outside of said stud; Q, the bolt-slide; R, the opening behind the tumbler racking-studs; S S', the tumbler-bellies; T T', the bolt-slide talons.

In making my improved trap-lock I take an ordinary lock now used for that purpose and place in it a locking-bolt and tail, in the usual manner. I employ a spring to thrust the bolt forward, as is now done when not forced back by pressure. I place within the case a number of tumblers, as is now done, provided with racking-studs and adapted to receive the various wards of a key to force them up and permit the bolt to be drawn back in the usual way. A space or gate, J, is left between the racking-studs to permit a racking-stump, I, which projects upward from the bolt-slide Q, which lies immediately upon the bolt-shank, to pass in and out as the key is moved backward and forward when the tumblers are lifted up into the proper position. Immediately behind the racking-studs H is a space, R, into which the racking-stump enters through the gate J when the tumblers are in the proper position. The tumblers are provided with springs G, which tend to press their free ends downward, except when lifted by the key against the pressure of said springs. As the main key, which is inserted from the outside of the box, is turned, its various wards pressing against the tumbler-bellies S' will operate to raise the several tumblers until the gate J is on a line with the racking-stump I, when the key, pressing against the talon T' of the bolt-slide, will draw the bolt-slide back and carry the racking-stump through the gate into the space R. When the bolt has been carried back to this point, the wards of the key pass into a hollowed space in the under edges of the tumblers, as shown in Fig. 6. When this has occurred, the tumblers are caused to fall through the pressure of the spring G, which brings the upper racking-studs on the tumblers in line of the racking-stump I, as shown in Fig. 6. This prevents the racking-stump from passing out through the gate J, and consequently the bolt from being thrust out until the tumblers have been raised; but while the main key has raised these tumblers in turning it in the direction to unlock the lock, its wards strike against notches K on the lower side of the tumblers when it is attempted to turn the key in the other direction to withdraw it from the lock. These notches prevent the key from being turned back far enough to raise the tumblers or to withdraw the key. Thus the main key with which the lock has been unlocked is trapped or held in position until other means than itself are employed to release it. While any citizen or person who has been furnished with a main key in the old style of lock may open the box, he cannot withdraw his key until the proper officials have released it with one of the release-keys, which are supposed to remain in their possession alone. When, therefore, a citizen has turned in an alarm of fire or has telephoned the police or other officials for any purpose, where the old style of lock is employed they can ascertain, on arriving and finding the citizen's main key in the lock, who has opened the lock, and ascertain the cause.

If the officials desire to unlock the box provided with the old style of lock, they must be provided with a main key in addition to their release-key, which necessitates the employment of two keys. To obviate this I have provided for a key which will serve the double capacity of releasing a main key when trapped and of drawing back the bolt when the tumblers are raised. This key will enable the officials to enter the box without trapping their key, and will enable them to release a citizen's key when trapped. I have termed this a "master-key," and have shown it in Fig. 8 of the drawings. This key enters the lock from the outside, as does the main key, and near the front part of the lock, so as not to interfere with the arrangement of parts necessary to trap the main key. Its wards press against the bellies S of the tumblers until they are lifted, and against the talon T of the bolt-slide, by which it and the bolt are pressed back. To accommodate this master-key and secure the results which its use enables one to obtain with a single set of tumblers, it will be noticed that I have provided them with a double set of bellies and the bolt-slide with a double set of talons to enable the main key and the master-key to respectively lift and move them.

I have shown the main key with square corners for its wards, as shown in Fig. 15; but in some cases it may be desirable to furnish a citizen with a special main key that will not trap. I have made such a key and illustrated it in Fig. 16. It is similar to the ordinary main key, except that the corners of its wards are rounded. This rounding of the corners causes the wards on the reverse movement of the key to contact against the notches K of the tumblers at an angle, so that the tumblers will be lifted, and thus enable the key to be removed. This will be the operation when the notches K are made at the usual angle shown for trapping the square wards of a main key, as shown in Fig. 13. To prevent a citizen, however, from rounding the corners of his key, and thus entering the box at pleasure without his key being trapped, I modify the shape of the notch K on the tumblers somewhat. Instead of employing an angle at about right angles, as shown in Fig. 13, I make the notch at an acute angle with the tumblers, as shown in Fig. 14. This will cause the notch to retain the key, although rounded the same as if it were an ordinary main key.

Experience has shown that this class of locks may be picked with a piece of bent wire or other implement by which the tumblers can be raised. I provide against this by placing the racking-studs on the tumblers slightly out of line, as shown in Fig. 10, and by providing one of them with a notch, O, as shown in Fig. 12. This notch is made by cutting out a portion from the inside of one of the upper racking-studs. It is immaterial which one is thus notched. By placing the racking-studs on the several tumblers slightly out of line, as shown in Fig. 10, the racking-stump will press against the one located farthest back or forward as the bolt is out or in. If the bolt be in, the racking-stump will be held against the racking-stud by the pressure of the spring F. If the wire with which the lock is attempted to be picked raises one of the tumblers against whose racking-stud the racking-stump is not pressed, it will simply fall back into place again when said wire ceases to hold it up. After the wire raises the particular tumbler whose racking-stud is in contact with the racking-stump, it is obvious that the racking-stump will be pushed forward by the spring until it is stopped by the next racking-stud, while the first racking-stud will rest upon the racking-stump and be unable to fall back while in that position. If the wire now raises the next tumbler whose racking-stud is in contact with the racking-stump, the racking-stump will again move forward, and this tumbler will in like manner be held from falling back into place. If, now, the wire raise the last tumbler, the racking-stud will be pushed through the gate and the lock will be picked. To prevent this I provide the notch O, (shown in Fig. 12.) This notch is made sufficiently deep and the rack sufficiently short to prevent the racking-stump from coming in contact with the rack until the other tumblers have been raised and held. When the last of the other tumblers has been raised, the racking-stump is pushed forward by the spring fully into the notch O. The other tumblers would be prevented from falling back into place, because their racking-studs would be resting on top of the racking-stump, and this tumbler would be prevented from being raised, because the notch would extend under the racking-stump. It is of no importance which one of the tumblers has its racking-stud provided with this notch, but whichever tumbler is thus provided should have its racking-stud located far enough out of line of the other tumblers to cause the racking-stump to enter this notch last. In this way the tumblers, which have already been raised cannot be lowered, and the tumbler which is provided with the notch in its racking-stud cannot be raised. The only way to relieve the situation would now be to again turn the key in the direction to draw the bolt back, which would remove the racking-stump from this notch and permit all of the tumblers to again fall into place. When this has been done, the person attempting to pick the lock would have to begin again and go through the same operation, and with invariably the same result. To prevent the lock from being picked and the bolt drawn back into the lock and the box opened, a similar arrangement and notch may be provided on the front of one of the racking-studs. I have shown this in Fig. 11. The racking-stump will enter this notch upon the bolt being pressed back precisely as in the case above described, and with the same result. Of course it will be understood that the tumbler thus provided with a racking-stud having a notch in the front or the rear thereof is intended to be used in a lock employing two or more tumblers. I have shown the notches O and P in the same stud in Fig. 12, as it is obvious that they may both be made in one stud on one tumbler or on different studs on different tumblers.

By constructing a lock as I have described above I practically prevent its being picked, and at the same time I dispense with the necessity of the officials being provided with more than the master-key, while at the same time I secure all of the advantages which result from a trapped lock.

It is not intended to claim herein, broadly, the construction shown in the application filed by Jacob F. Mehren for Letters Patent for trapped latch-locks, April 21, 1887, having serial number 235,608, but to confine the case to the particular construction shown and described.

What I regard as new, and desire to secure by Letters Patent, is—

In a trap-lock, the combination of a single set of tumblers having bellies against which a main and a master key respectively contact, a bolt, a bolt-slide provided with talons against which a main and a master key respectively contact, and a trapable main and untrapable master key, whereby the master-key may open the lock and also release the main key when trapped, substantially as described.

JOHN F. WOLLENSAK.

Witnesses:
 W. E. GILL,
 GEORGE C. COOK.